United States Patent
Al-Sheyyab et al.

(10) Patent No.: US 9,422,024 B2
(45) Date of Patent: Aug. 23, 2016

(54) BICYCLE FRAME, BICYCLE AND METHOD FOR PRODUCING A BICYCLE FRAME

(75) Inventors: Ahmad Al-Sheyyab, Rehau (JO); Timo Köhler, Grub am Forst (DE)

(73) Assignee: Rehau AG + Co, Rehau (DE)

( * ) Notice: Subject to any disclaimer, the term of this patent is extended or adjusted under 35 U.S.C. 154(b) by 0 days.

(21) Appl. No.: 14/240,746

(22) PCT Filed: Aug. 30, 2012

(86) PCT No.: PCT/EP2012/003642
§ 371 (c)(1),
(2), (4) Date: Feb. 25, 2014

(87) PCT Pub. No.: WO2013/029788
PCT Pub. Date: Mar. 7, 2013

(65) Prior Publication Data
US 2014/0191492 A1 Jul. 10, 2014

(30) Foreign Application Priority Data
Aug. 30, 2011 (DE) .......................... 10 2011 053 100

(51) Int. Cl.
*B62K 19/18* (2006.01)
*B62K 19/22* (2006.01)
(Continued)

(52) U.S. Cl.
CPC ................. *B62K 19/16* (2013.01); *B29C 65/02* (2013.01); *B29C 65/18* (2013.01); *B29C 66/1122* (2013.01); *B29C 66/1222* (2013.01); *B29C 66/1224* (2013.01); *B29C 66/1312* (2013.01); *B29C 66/5346* (2013.01); *B29C 66/547* (2013.01); *B29C 66/721* (2013.01); *B29C 66/72141* (2013.01); *B29C 66/7392* (2013.01);
(Continued)

(58) Field of Classification Search
CPC ........ B62K 19/02; B62K 19/16; B62K 19/22; B62K 19/28; B62K 19/18; B62K 19/20; B29C 65/02; B29C 65/48; B29C 66/547; B29C 66/7212
USPC .................. 280/274, 281.1, 288.2, 288.3, 208
See application file for complete search history.

(56) References Cited

U.S. PATENT DOCUMENTS

| 4,548,422 A | 10/1985 | Michel et al. |
| 5,456,481 A | 10/1995 | Allsop et al. |

(Continued)

FOREIGN PATENT DOCUMENTS

| DE | 74 32 809 | 7/1975 |
| DE | 20 2006 019341 | 3/2007 |

(Continued)

OTHER PUBLICATIONS

Peter Barzel, Michael Bollschweiler, Chirstian Smolik, "Die neue Fahrredtechnik-Material Konstruktion Fertigung", May 5, 2008, BVA-Bielefelder Verlag GmbH & Co.

(Continued)

*Primary Examiner* — Anne Marie Boehler
(74) *Attorney, Agent, or Firm* — Da Vinci Partners LLC; John Moetteli (57) ABSTRACT

Bicycle frame formed by a half-shell (1) made of a thermoplastic material. The half-shell (1) is fiber-reinforced at least in regions, and includes a cover element (2), which is, at least in regions, connected to the half-shell and preferably closes the half-shell.

23 Claims, 8 Drawing Sheets

(51) Int. Cl.
*B29C 65/02* (2006.01)
*B29C 65/48* (2006.01)
*B62K 19/16* (2006.01)
*B62K 19/30* (2006.01)
*B29C 65/00* (2006.01)
*B29C 65/18* (2006.01)
*B29L 31/30* (2006.01)
*B29C 65/16* (2006.01)
*B29C 65/56* (2006.01)
*B29C 65/60* (2006.01)
*B29C 51/14* (2006.01)
*B29C 65/06* (2006.01)
*B29C 65/14* (2006.01)

(52) U.S. Cl.
CPC ............ *B29C 66/73921* (2013.01); *B62K 19/18* (2013.01); *B62K 19/30* (2013.01); *B29C 51/145* (2013.01); *B29C 65/06* (2013.01); *B29C 65/1412* (2013.01); *B29C 65/16* (2013.01); *B29C 65/48* (2013.01); *B29C 65/562* (2013.01); *B29C 65/60* (2013.01); *B29C 66/21* (2013.01); *B29C 66/545* (2013.01); *B29C 66/71* (2013.01); *B29C 66/7212* (2013.01); *B29L 2031/3091* (2013.01); *Y10T 29/49826* (2015.01)

(56) References Cited

U.S. PATENT DOCUMENTS

| | | | |
|---|---|---|---|
| 5,769,442 A | 6/1998 | Robinson et al. | |
| 6,123,353 A | 9/2000 | Bennett et al. | |
| 6,139,040 A * | 10/2000 | Dempsey | 280/288.3 |
| 6,270,104 B1 * | 8/2001 | Nelson et al. | 280/281.1 |
| 7,562,890 B2 * | 7/2009 | Yu | 280/288.3 |
| 2012/0034833 A1 * | 2/2012 | Schaube et al. | 442/172 |

FOREIGN PATENT DOCUMENTS

| | | |
|---|---|---|
| DE | 10 2007 036869 | 1/2009 |
| EP | 0 511 421 | 11/1992 |
| EP | 0 861 769 | 9/1998 |
| FR | 2 934 238 | 1/2010 |
| GB | 1 281 731 | 7/1972 |
| WO | WO 95/27648 | 10/1995 |

OTHER PUBLICATIONS

International Search Report, International patent application No. PCT/EP2012/003642, Mar. 7, 2013.

* cited by examiner

BICYCLE FRAME, BICYCLE AND METHOD FOR PRODUCING A BICYCLE FRAME

CROSS REFERENCE TO RELATED APPLICATIONS

This application is the National Stage of International Application No. PCT/EP2012/003642, filed Aug. 30, 2012, which claims benefit under 35 USC §119(a), to German patent application Ser. No. 10 2011 053 100.9, filed Aug. 30, 2011.

The invention relates to a bicycle frame and a method for manufacturing a bicycle frame.

It is known to manufacture bicycle frames from metal or from duroplastic, fiber-reinforced material by way of a wrapping process or from a multiplicity of individual tubular sections involving complex manual labor.

DE 38 04 342 02 discloses a bicycle frame and an associated front-wheel fork, both made from high-pressure die-cast light metals or high-pressure diets cast thermoplastics.

DE 196 40 955 A1 discloses a method for manufacturing a hollow-body profile for bicycle frames, the hollow-body profile being configured as a composite body constructed using a plurality of shell-shaped elements. Likewise, DE 692 130 07 T discloses a manufacturing method for bicycle frames made from a polymer material, U.S. Pat. No. 6,340,509 B1 describes a composite bicycle frame containing reinforcement fibers.

Moreover, there have been some attempts in the past to produce bicycle frames entirely from thermoplastic material by way of a plastics injection-molding process. While corresponding cycle times here undercut those of a duroplastic bicycle frame by orders of magnitude, however, on account of the modest maximum wall thicknesses (a few centimeters or millimeters) which can be achieved in the plastics injection-molding process, the mechanical properties of such bicycle frames are insufficient.

The invention, therefore, has set itself the object of providing a bicycle frame which, as compared with the prior art, offers economical manufacturing and improved mechanical properties.

According to the invention, this object is achieved by a bicycle frame formed by at least one half-shell consisting of a thermoplastic material, which is fiber-reinforced at least in regions, and by a cover element, which is, in regions, connected to the half-shell and preferably closes said half-shell. A half-shell can be manufactured in a simple and cost-effective manner by way of a pressing process, a thermoforming process (deep-drawing process under increased temperature) or by integrated forming in an injection-molding die by employing a thermoplastic material at short cycle times, as compared with duroplastic materials.

The cover element is preferably configured at least substantially in a mirror-imaged manner to the half-shell. Slight deviations in the mirror image emerge in particular with respect to differences in the fastening of additional elements; components of the brake system, for example, may possibly only have to be routed on one side of the bicycle frame, i.e. either on the side of the cover element or on the side of the half-shell, such that, in an exemplary manner, on account of this the afore-described deviations in relation to a mirror-imaged arrangement emerge.

The half-shell and the cover element are preferably connected to one another by overlapping and/or mutually closely fitting joining portions. The joining portions here are preferably configured as planar faces in the peripheral regions of the half-shell or of the cover element.

At least one heating element, which can be supplied with electrical power, may be arranged in the region of the joining portions, the heating element being formed preferably by at least one metal conductor or by at least one carbon fiber. In the case of a corresponding electrical power supply, the at least one heating element which can be supplied with electrical power provides the energy required for producing the connection, said energy being advantageously released only locally in the region of the joining portions, such that the adjoining region of the half-shell and/or of the cover element is not exposed to any, or only to low, thermal load. The supply of electrical power here may take place by directly applying a voltage or indirectly by way of induction by means of an alternating field. A further advantage is derived when a metal conductor (such as, for example, a resistance wire) is employed, since the latter can be further used as a signal conductor and/or electrical conductor after the half-shell and the cover element have been connected to one another. Furthermore, employing a carbon fiber offers the advantage of increasing the strength of the connection region of the joining portions.

The heating element may be arranged on the joining portion, for example, by means of a form-fitting and/or a force-fitting connection. The heating element is preferably accommodated within the joining portion, for example, in that the heating element is molded on or overmolded in a plastics injection-molding process during manufacturing of the corresponding joining portion. This ensures that the heating element is always in the correct position in relation to the joining portions.

The half-shell and the cover element are preferably connected to one another by means of an adhesive layer and/or a welded connection and/or a screw connection and/or a riveted connection and/or a clinch connection. In particular the combination of an adhesive layer and of a punctiform connection (e.g. spot-welded connection, screw connection, riveted connection or clinch connection) enable, on the one hand, immediate bonding between the cover element and the half-shell on account of the punctiform connection and, on the other hand, a laminar connection by way of an adhesive layer, which is therefore significantly more tolerant in particular with respect to an oscillating load. On account of the thermoplastic material from which the half-shell and preferably also the cover element are formed, a multiplicity of welding processes may be advantageously employed in comparison to bicycle frames made from a duroplastic material. A friction welding process or a laser welding process is particularly suited to connecting the half-shell and the cover element. Alternative welding processes may include induction welding, infrared welding, resistance welding, vibration welding or heat-element welding. An additional material, preferably likewise a fiber-reinforced thermoplastic material, may preferably be added in the case of all aforementioned welding processes. A tape-shaped additional material, i.e. a tape, consisting of a continuous-fiber-reinforced thermoplastic material, is in particular suited as an additional material. A corresponding tape-shaped additional material is, however, also suited to an adhesive connection of the half-shell and the cover element and may be arranged as reinforcement in the region of the joining portions and/or be adhesively bonded together with the joining portions.

The half-shell and/or the cover element may have at least one U-shaped cross section having, adjacent thereto, joining portions. Here, a V-shaped cross section is considered to be a sharply tapered U-shaped cross section. Such cross-sectional geometries can be produced in a particularly simple and cost-effective manner by means of forming processes and/or primary shaping processes known to a person skilled in the art and, moreover, have a homogenous tension profile in the bicycle frame according to the invention.

The half-shell and/or the cover element preferably have/has at least two U-shaped, cross sections which are coupled to one another via at least one joining portion which is preferably arranged between the U-shaped cross sections. The joining portion between the at least two U-shaped cross sections, on the one hand, potentially increases the available joining area and, on the other hand, increases the stiffness of the bicycle frame according to the invention. Connection of the joining portion between the at least two U-shaped cross sections takes place in an analogous manner to the afore-described possibilities by means of an adhesive layer and/or a welded connection and/or a screw connection and/or a riveted connection and/or a clinch connection.

In order to further lower the production costs for the bicycle frame according to the invention, it may be advantageously provided that the half-shell and/or the cover element have/has at least one function-integrating element which is formed thereon, in particular in a plastics injection-molding process. The function-integrating element may be configured as a stiffening rib or as a, preferably metallic, insert or as a retaining element or as a protection element or as a current-conducting element or as a spray-guard element or as a storage-space element or as a lighting-accommodating element or as a connecting element or as a media duct or as an impact-protection element or as a screw-element receptacle (screw dome). In a particularly advantageous manner, the further components required for the completion of a bicycle, such as, for example, wheel drop-outs or bottom brackets or steering-tube receptacles, can be integrated already during manufacture of the bicycle frame, such that additional joining and/or assembly operations can be dispensed with here. On account of the thermoplastic material of the half-shell and/or of the cover element, the function-integrating element, if applicable, can be formed thereon by means of a plastics injection-molding process. An impact-protection element, in particular, can be molded on in a plastics injection-molding process using a plastic material (using an adhesion promoter, if applicable) which is softer in relation to the thermoplastic material of the cover element and/or to the thermoplastic material of the half-shell. The impact-protection element advantageously protects the surface structure and the integrity of the bicycle frame.

The half-shell and the cover element jointly preferably enclose a cavity. At least one electric conductor and/or at least one control line and/or at least one media line and/or at least one motion transmission organ and/or at least one energy store is/are preferably arranged within the cavity. On account of the construction according to the invention of the bicycle frame having at least one half-shell, the cavity which is jointly enclosed by the half-shell and the cover element can be utilized for routing and protecting the aforementioned elements. The aforementioned elements are advantageously protected in particular against the effects of weather and contamination.

At least one of the aforementioned joining portions may, at least in portions, be covered by a concealing element which is formed thereon, in particular in a plastics injection-molding process. The concealing element here serves a double purpose in that it, on the one hand, insulates or protects the joining portions—and thus a part of or the entire joining zone—against the effects of weather and, on the other hand, covers and thus conceals the esthetically potentially negative impact of said joining portions. On account of the employment of a thermoplastic material for the half-shell and preferably also the cover element, the concealing element can be formed thereon particularly by means of a plastics injection-molding process. The concealing element may also serve for connecting the joining portions. The joining portions then preferably have mutually congruent moldings in the material (e.g. holes or projecting regions) which, for the formation of undercuts, are hot-run injection-molded, purge-molded or overmolded by the plastic material which forms the concealing element.

The half-shell and/or the cover element may in each case have zones with a fiber reinforcement which is developed to a varying degree, such that the resilience of the zones is adapted to the stress which is to be expected there. In zones where stress is expected to be high, such as e.g. in the region of the bottom bracket, of the steering tube or of the upper or lower tube of a bicycle frame, a denser and/or more resilient fiber reinforcement of the thermoplastic material and/or a fiber reinforcement having a higher fiber volume content in the thermoplastic material may be provided.

The half-shell and/or the cover element are/is preferably formed from a fiber-reinforced thermoplastic organometallic sheet by a forming process. The fiber-reinforced thermoplastic material of the half-shell and/or of the cover element may be formed from a fiber-reinforced thermoplastic organometallic sheet by a forming process. An organometallic sheet is a plate-shaped or tape-shaped thermoplastic semi-finished product (prepreg) containing reinforcement fibers, which, in an analogous manner to a sheet metal, can be subjected to subsequent forming steps. In the aforementioned cases in which one of the aforementioned joining portions is at least in portions concealed by a concealing element formed thereon in a plastics injection-molding process or in which the half-shell and/or the cover element have/has at least one function-integrating element which has been formed thereon in an injection-molding process, the forming process may advantageously take place within the injection-molding die required therefor. Alternatively, the forming process takes place prior to the introduction of the organometallic sheet, which has at that point already been formed, into the aforementioned injection-molding die.

The half-shell and/or the cover element may be manufactured in a plastics injection-molding process, merely one or more part region/s of the half-shell and/or of the cover element being formed by at least one fiber-reinforced thermoplastic organometallic sheet which is molded, backmolded and/or overmolded thereon. In this context, one also refers to a hybrid construction of the half-shell and/or of the cover element, having injection-molded regions and having regions which are formed by at least one fiber-reinforced thermoplastic organometallic sheet which is preferably manufactured by means of a forming process. The forming process advantageously takes place within the actual injection-molding die. Alternatively, the forming process takes place prior to the introduction of the organometallic sheet, which has at that point already been formed, into the aforementioned injection-molding die. The injection-molded regions may have a short-fiber and/or long-fiber reinforcement. The organometallic sheet or sheets preferably forms/form the zones with a fiber reinforcement which is developed to a varying degree, such that the resilience of the zones is adapted to the stress which is to be expected there. The organometallic sheet or sheets is/are preferably arranged in the region of the bottom bracket, of the steering tube or of the upper or lower tube of a bicycle frame. The organometallic sheet may have a denser and/or more resilient fiber reinforcement of the thermoplastic material and/or a fiber reinforcement having a higher fiber volume content in the thermoplastic material of the organometallic sheet as compared with the injection-molded regions.

The fiber reinforcement of the thermoplastic material or of the thermoplastic organic sheet or of the additional material may, in regions or entirely, consist of short and/or long fibers and/or continuous fibers. The continuous fibers may be oriented unidirectionally or configured as a woven fabric. The fiber reinforcement of the thermoplastic material and/or of the thermoplastic organometallic sheet and/or of the additional material may be formed by glass fibers, carbon fibers, aramid fibers, basalt fibers, mineral fibers, fibers from renewable raw materials, metal fibers and/or by polymer fibers. The organometallic sheet may have a multilayered construction consisting of at least two layers. Here, a layer having a glass-fiber reinforcement preferably alternates with a layer having a carbon-fiber reinforcement. Furthermore preferably, the layer having a carbon-fiber reinforcement forms the outer surface (visible face) of the bicycle frame.

The thermoplastic material and/or the thermoplastic matrix (the thermoplastic material) of the organometallic sheet and/or the thermoplastic material of the additional material may comprise polyamide (PA), in particular polyamide 6 or polyamide 6.6, polypropylene (PP), polyethylene (PE), POM (polyoxymethylene), polyphenylene sulphide (PPS), polyether ether ketone (PEEK), polyetherimide (PEI), polyethylene terephthalate (PET), polyphthalamide (PPA), comparable engineering or high-temperature plastic materials or combinations of the aforementioned plastic materials.

A method according to the invention for manufacturing a bicycle frame according to the invention comprises the following steps;
providing at least one half-shell consisting of a thermoplastic material, which is fiber-reinforced at least in regions,
providing a cover element,
connecting, in regions, the half-shell and the cover element, preferably to form a closed hollow body.

The provision of the half-shell and/or of the cover element may take place preferably by way of at least one forming step of a fiber-reinforced thermoplastic organometallic sheet.

The aforementioned method enables a cost-effective and economical manufacturing of bicycle frames according to the invention as described in claims 1 to 18.

A bicycle frame according to the invention can be part of a bicycle, an electric bicycle (referred to as an e-bike), a pedelec, a motor-assisted bicycle or a motorcycle.

The invention is described in the following with reference to drawings merely illustrating exemplary embodiments. In the drawings, and in a schematic manner.

In, the figures, elements which are the same or have the same function are provided with the same reference signs.

Figure 1:
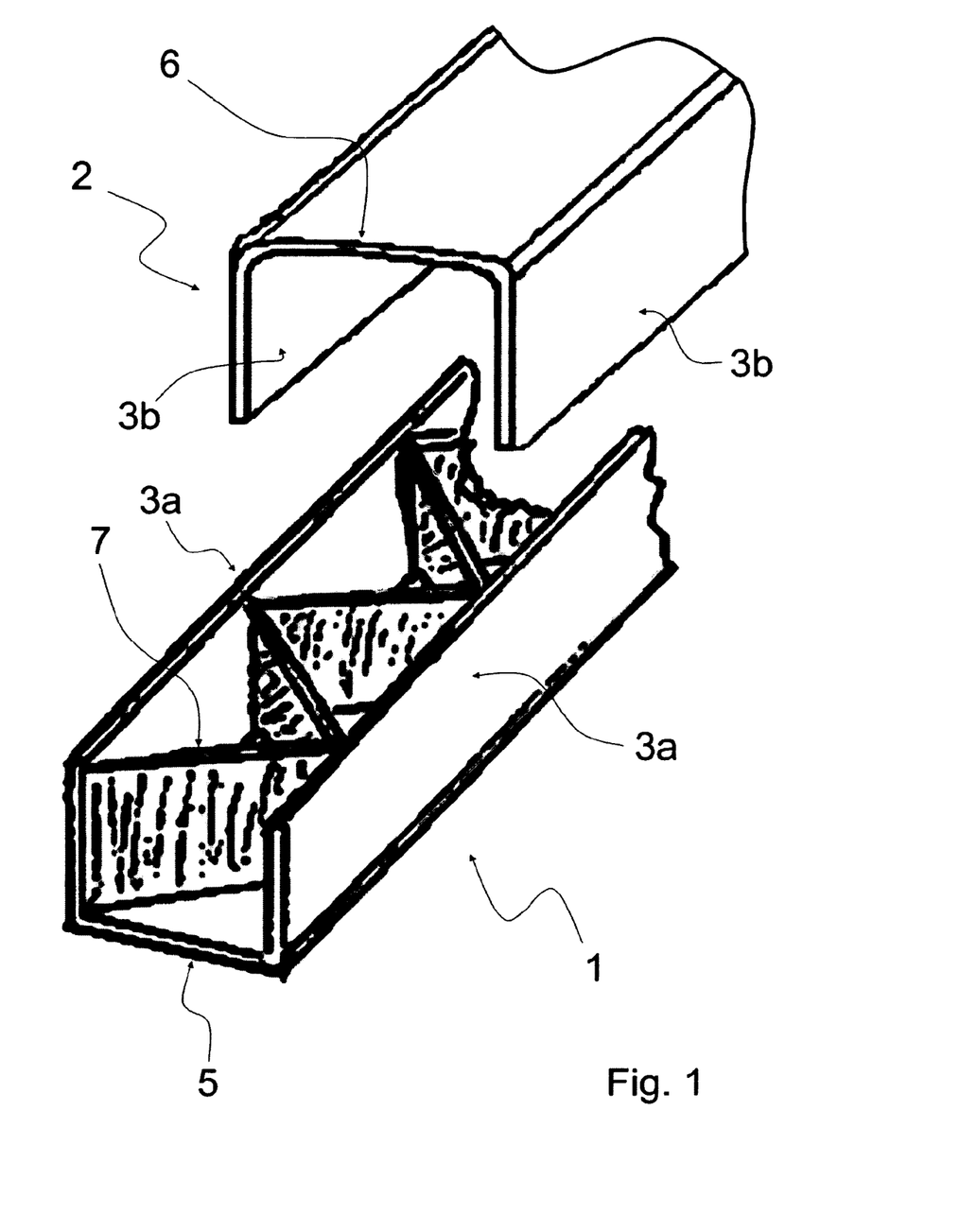
FIG. 1 shows a spatial illustration of part of a bicycle frame according to the invention in section.

FIG. 1 shows part of a bicycle frame according to the invention prior to connecting, in regions, the half-shell 1 consisting of a fiber-reinforced thermoplastic material to a cover element 2 consisting of a fiber-reinforced thermoplastic material, the cover element 2 closing the half-shell 1 in the connected state. The half-shell 1 and the cover element are formed using a carbon-fiber-reinforced polyamide 6.6. The half-shell 1 has a U-shaped cross section 5 having, adjacent thereto, joining portions 3a. The cover element 2 likewise has a U-shaped cross section 6 having, adjacent thereto, joining portions 3b. In the connected state, the half-shell 1 and the cover element 2 are connected to one another by overlapping and by mutually closely fitting joining portions 3a and 3b. The half-shell 1 has a function-integrating element, formed thereon in an injection-molding process, in the form of stiffening ribs. The half-shell 1 and the cover element 2 are formed from a fiber-reinforced thermoplastic organometallic sheet by a forming process.

Figures 2, 3, 4:
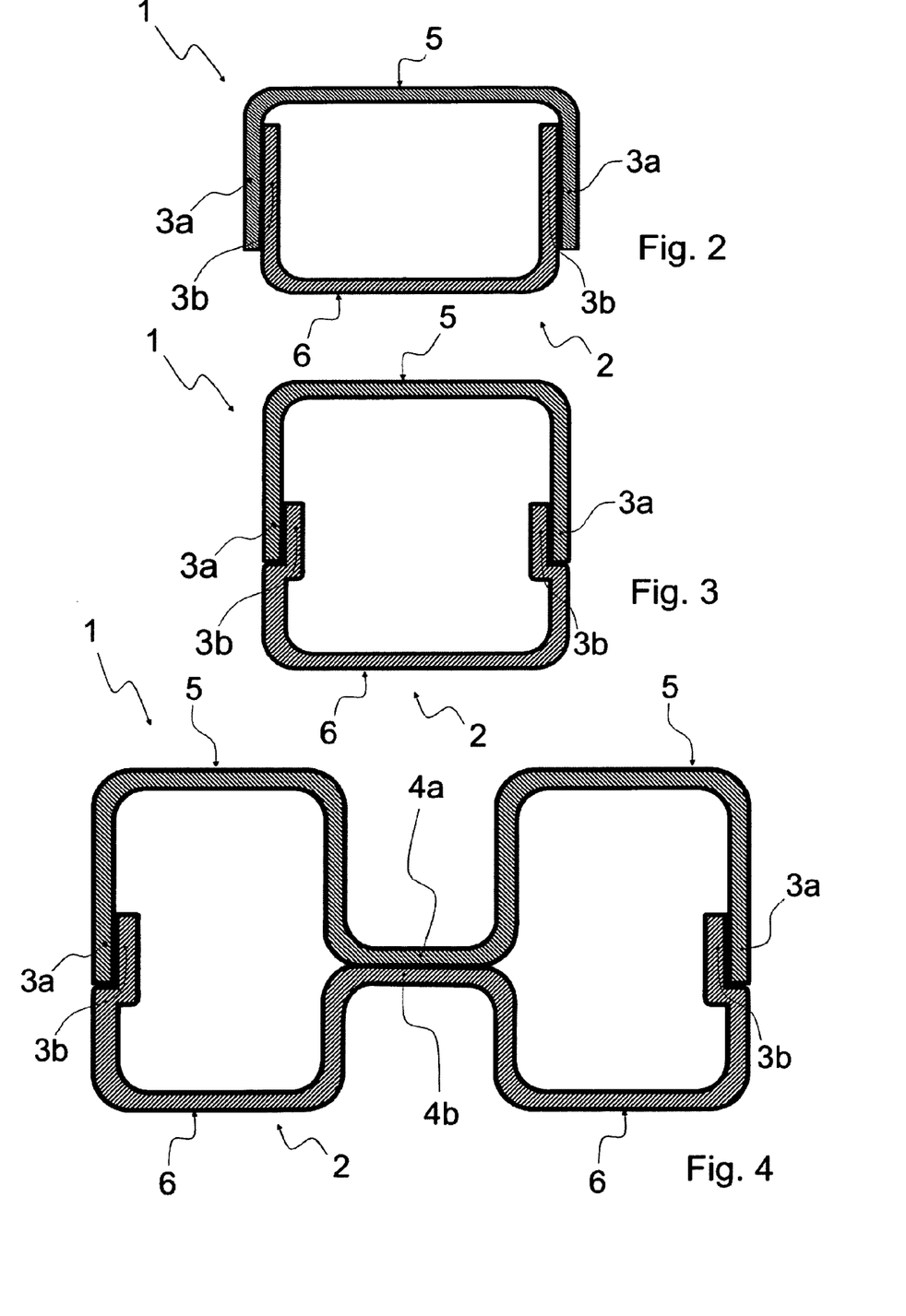
FIGS. 2 and 3 show cross-sectional illustrations of the bicycle frame according to the invention in the connected state.
FIG. 4 shows a bicycle frame according to the invention having two cross-sectional geometries which are configured in a U-shape and connected via an additional joining portion.

FIGS. 2 and 3 show further embodiments of the bicycle frame according to the invention, a cross-sectional illustration being shown here in each case. In FIGS. 2 and 3, the half-shell 1 is configured to be U-shaped or has a U-shaped cross section 5, having, adjacent thereto, joining portions 3a. The cover element 2 likewise has in each case a U-shaped cross section 6 which has, adjacent thereto, joining portions 3b. The half-shell 1 and the cover element 2 which is, in regions, connected to and closes the half-shell 1, are connected to one another via the overlapping and mutually closely fitting joining portions 3a, 3b. In FIG. 3, the joining portions 3h of the cover element 2 are configured such that, in the connected state of the half-shell 1 and the cover element 2, a bicycle frame having largely planar outer faces results. The fiber reinforcement of the thermoplastic material of the half-shell 1 comprises, in regions or entirely, continuous fibers. The reinforcement is formed by glass fibers, the thermoplastic material comprising PEEK.

FIG. 4 shows a further embodiment of a bicycle frame according to the invention in a cross section, wherein the half-shell 1 and the cover element 2 have in each case two U-shaped cross sections 5 and 6 which are coupled to one another via a joining portion 4a or 4b. These joining portions 4a and 4b which are additionally configured to the overlapping and mutually closely fitting joining portions 3a and 3b enlarge the joining face via which the half-shell 1 and the cover element 2 are, in regions, connected to one another.

Figure 5:
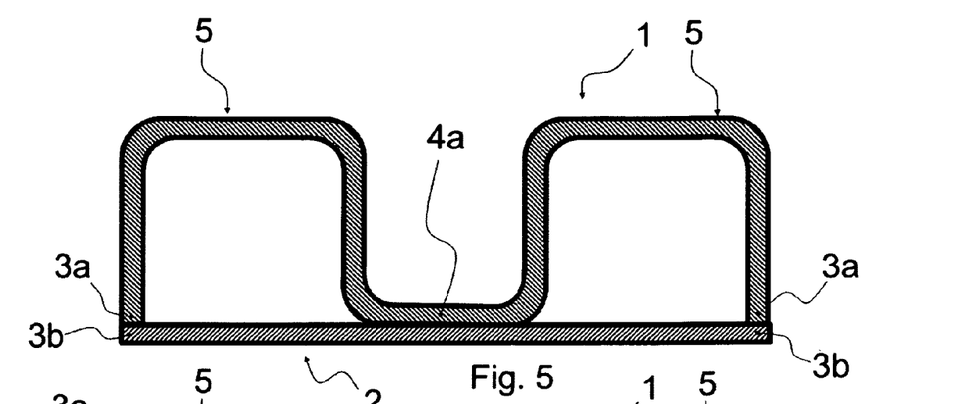
FIGS. 5 to 7 show further embodiments with half shells having U-shaped cross sections.
Figures 6, 7:
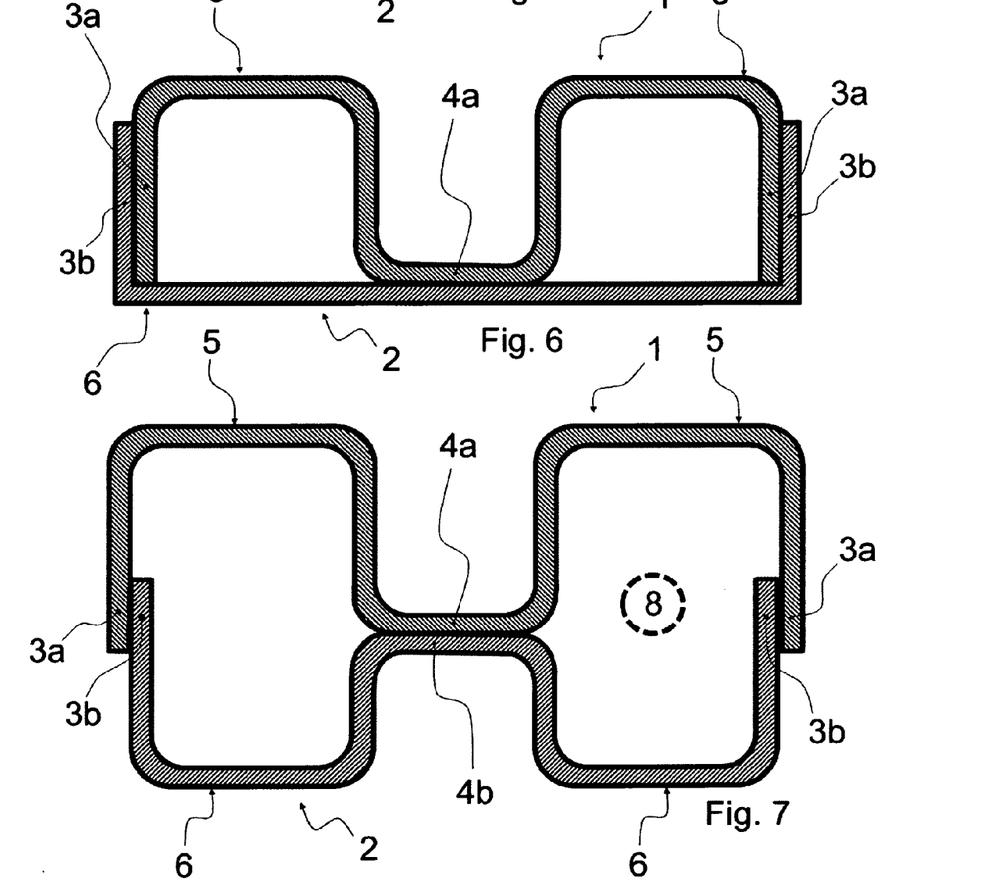

FIGS. 5 and 6 show further embodiments of a bicycle frame according to the invention in a cross section. The embodiments have in each case a half-shell 1 having at least two U-shaped cross sections 5 which are coupled to one another via a joining portion 4*a*. In FIG. 5, the cover element is configured to be substantially two-dimensional. The cover element 2 in FIG. 6 has only one U-shaped cross section 6 which, via the joining portions 3*b* adjacent thereto, is connected to the joining portions 3*a* of the half-shell 1. In the central region, the joining portion 4*a* of the half-shell 1 bears in a two-dimensional manner on the central region of the cover element 2 and is likewise connected to the latter here.

FIG. 7 substantially corresponds to the exemplary embodiment of FIG. 4, the overlapping joining portions 3*a* and 3*b* of the half-shell 1 or of the cover element 2 here forming a step in the material thickness of the half-shell 1 on the corresponding outer faces of the bicycle frame. The half-shell 1 and the cover element 2 enclose a cavity, an electrical conductor or a control line or a media line or a motion transmission organ (e.g. a Bowden cable) or an energy store being arranged within the cavity (reference sign 8—symbolically indicated by a dashed line).

Figure 8:
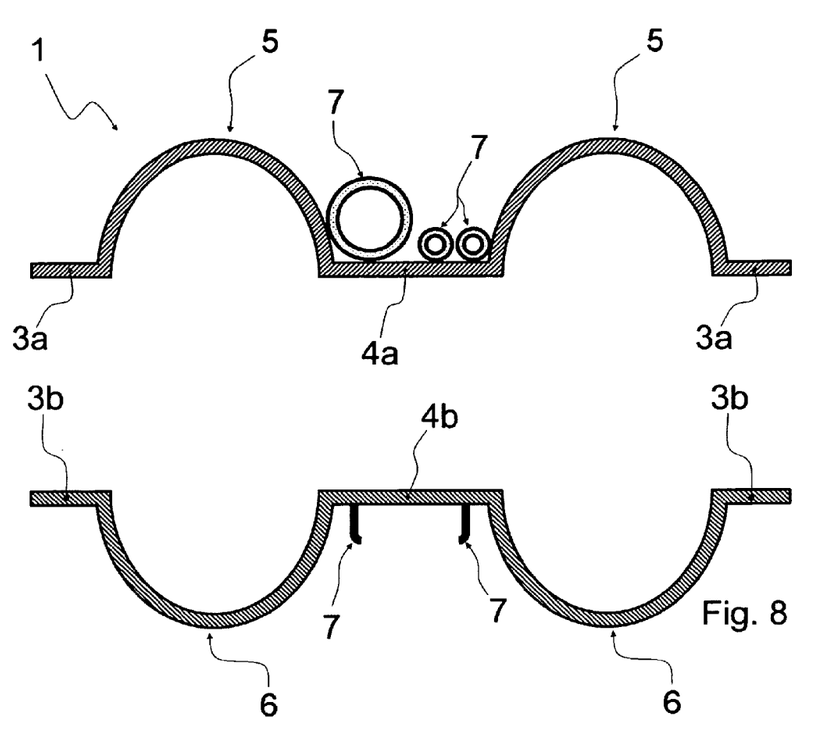
FIG. 8 shows a further embodiment of a bicycle frame according to the invention having function-integrating elements formed thereon, prior to being connected to a half-shell and a cover element.
Figure 9:
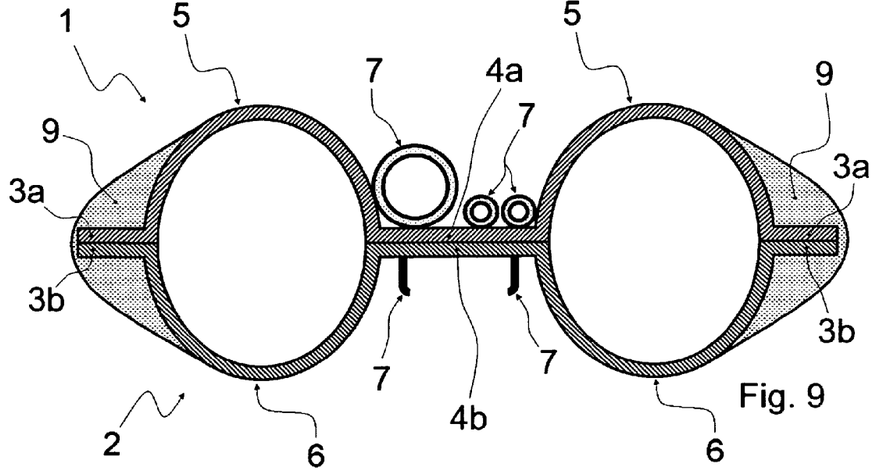
FIG. 9 shows the bicycle frame illustrated in FIG. 8 in the connected state and having concealing elements formed thereon.

FIGS. 8 and 9 show in a cross section a further embodiment of a bicycle frame according to the invention, prior to and after the half-shell 1 and the cover element 2 having been connected. In the connected state (cf. FIG. 9), the joining portions 3*a* and 3*b* of the half-shell 1 and of the cover element 2 are concealed by a concealing element 9 which is formed thereon. The concealing element 9 consists of a plastic material which is of the same type or is at least compatible with the thermoplastic material of the half-shell 1 and is molded thereon by means of an injection-molding process. On account of this, an improved protection of the joining zone formed by the joining portions 3*a* and 3*b* against environmental influences is achieved, on the one hand, and an improved esthetic impact of the bicycle frame according to the invention, on the other. In the region of the joining portions 4*a* and 4*b* of the half-shell 1 and of the cover element 2, function-integrating elements 7 in the form of a media duct 7*e* (e.g. for hydraulic fluid), electric conductors 7*f* and a retaining element 7*g* are formed thereon.

Figure 10:
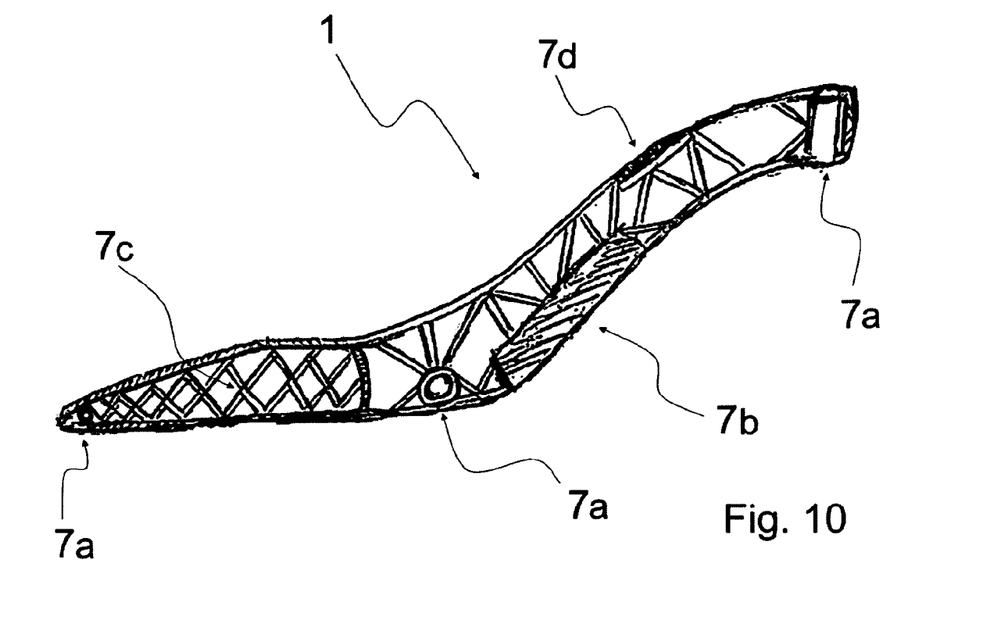
FIG. 10 shows a three-dimensional illustration of the inner region of the half-shell of a bicycle frame according to the invention.

FIG. 10 shows an interior view of a half-shell 1 of a bicycle frame according to the invention. The half-shell 1 has function-integrating elements which are formed thereon in an injection-molding process and which are in the form of metallic inserts 7*a*, a storage-space element 7*b* for accommodating e.g. an electrical energy store, stiffening ribs 7*c* and connecting elements 7*d* to an element which accommodates the seat (not illustrated in more detail here). The half-shell 1 has zones with a fiber reinforcement which is developed to a varying degree, such that the resilience of the zones is adapted to the stress which is to be expected there. In the zones where stress is expected to be high, such as e.g. in the region of the bottom bracket, of the steering tube or of the upper or lower tube of the bicycle frame, a denser and/or more resilient fiber reinforcement of the thermoplastic material is provided.

Figure 11:
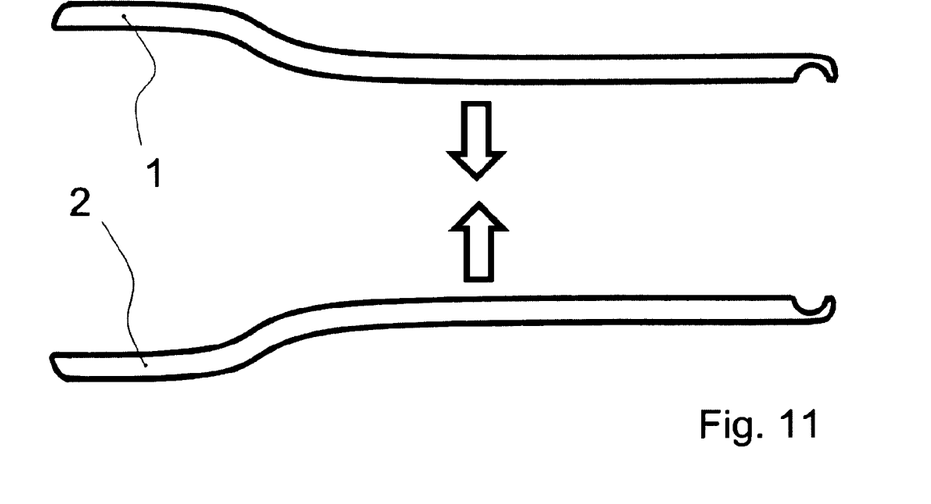
FIG. 11 shows a schematic illustration of a plan view of a bicycle frame according to the invention prior to the half-shell and the cover element being connected.

FIG. 11 now shows in a schematic manner in a plan view from above (in relation to the completed bicycle frame) how a half-shell 1 corresponding to FIG. 10 is connected to a provided cover element 2 which is configured substantially in a mirror-imaged manner to the half-shell 1. The connection here takes place in regions between the half-shell 1 and the cover element 2 which both form a closed hollow body in the process. On account of the connection in regions, an open cover element 2 or an open half-shell 1, between which a rear wheel can correspondingly be accommodated, is present in the region of the rear wheel drop out (that is at the end which is opposite from the steering tube receptacle). It is conceivable to likewise seal off these regions against the effects of weather by way of further additional cover elements.

Figure 12A:
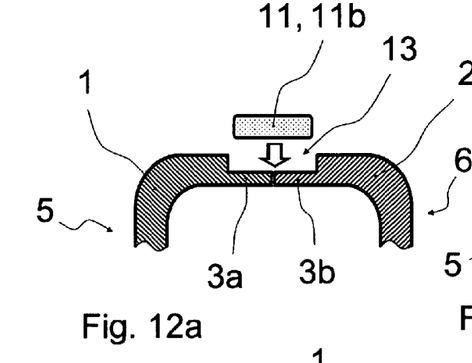
FIGS. 12a-c show a further embodiment of a bicycle frame according to the invention having a heating element which is arranged in the region of the joining sections.
Figure 12B:
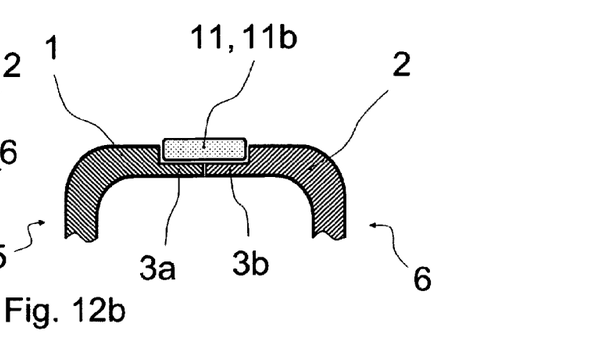
Figure 12C:
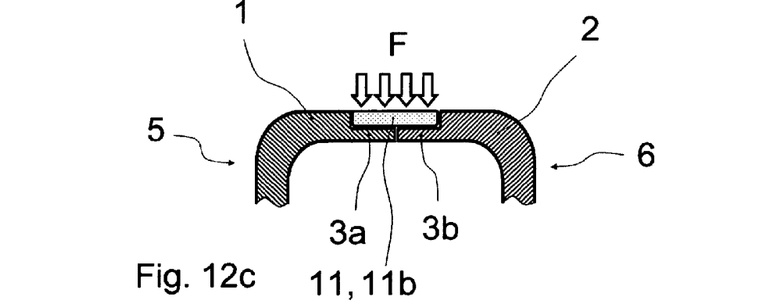

FIG. 12 shows, by way of individual steps and in a schematic manner, the connection of a half-shell 1 consisting of a fiber-reinforced thermoplastic material to a cover element 2, which closes the former, by two mutually closely fitting (but not necessarily contacting) joining portions 3*a* and 3*b*. The cover element 2 is configured at least substantially in a mirror-imaged manner to the half-shell 1. The half-shell 1 and the cover element 2 have in each case a U-shaped cross section 5, 6 (here illustrated only in part) with, adjacent thereto, the joining portions 3*a* and 3*b*. The two joining portions 3*a* and 3*b* are formed by a reduction in the wall thickness of the peripheral regions of the half-shell 1 and the cover element 2. The free space 13 which is created serves for accommodating a heating element 11 which is arranged in the region of the joining portions 3*a*, 3*b* and which can be supplied with power. The heating element 11 here is formed by a continuous-fiber-reinforced tape having a thermoplastic matrix, the fiber reinforcement of said tape comprising a multiplicity of carbon fibers 11*b* (cf. FIG. 12*a*). Subsequently, the heating element 11 which is arranged in the region of the joining portions 3*a*, 3*b* is supplied with power, i.e. an electric current passes through it (cf. FIG. 12*b*). The heating element which is heated in the process heats up both the thermoplastic matrix of the continuous-fiber-reinforced tape and the fiber-reinforced thermoplastic material of the two joining portions 3*a*, 3*b* to their melting temperature or beyond. The connection zone created is subsequently or simultaneously pressed using a force F (cf. FIG. 12*c*), such that the free space 13 is substantially completely occupied. After this welded connection zone has cooled, the continuous-fiber reinforcement of the tape/heating element 11 ensures an increased strength of the bond between the half-shell 1 and the cover element 2.

Alternatively, the connection of the half-shell 1 and the cover element 2, which is shown in FIG. 12*c*, may be achieved by a joining method which is different from a welding-only method. A cohesive adhesive connection, in particular, between the joining portions 3*a*, 3*b* may also be implemented using an adhesively fixed continuous-fiber-reinforced and/or fiber-interwoven tape, or organometallic sheet, the fiber reinforcement of which may not necessarily be formed by carbon fibers or metal fibers, but also by electrically non-conducting fibers, such as e.g. glass fibers, aramid fibers, basalt fibers, mineral fibers, fibers from renewable raw materials and/or polymer fibers.

Figure 13:
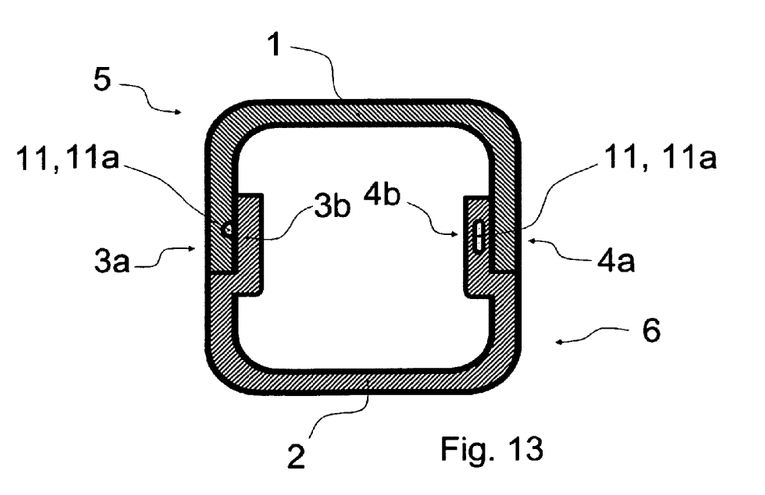
FIG. 13 shows a cross-sectional illustration of a further bicycle frame according to the invention, having heating elements which are arranged in the region of the joining portions.

FIG. 13 shows an alternative connection of a half-shell 1 consisting of a fiber-reinforced thermoplastic material with a cover element 2, which closes the former, by overlapping joining portions 3*a*, 3*b* and 4*a*, 4*b*. The cover element 2 is configured at least substantially in a mirror-imaged manner to the half-shell 1. The half-shell 1 and the cover element 2 have in each case a U-shaped cross section 5, 6 with, adjacent thereto, joining portions 3*a*, 3*b* and 4*a*, 4*b*. Heating elements 11 which can be supplied with electrical power are arranged in the region of the joining portions 3*a*, 3*b* and 4*a*, 4*b*, the heating elements 11 being formed by metal conductors 11*a*. The heating element 11 in the form of a wire-shaped metal conductor 11*a*, which is arranged between the two joining portions 3*a* and 3*b*, is accommodated in a form-fitting and force-fitting manner in a material deformation of the half-shell 1 or of the joining portion 3*a* of the half-shell 1. The wire-shaped metal conductor 11*a* here is attached to the material deformation prior to the positioning of the joining portions 3a, 3b in relation to one another. The heating element 11 in the form of a tape-shaped metal conductor 11a, which is arranged between the two joining portions 4a and 4b, is accommodated within the joining portion 4b of the cover element 2. The joining portion 4b here is manufactured by way of a plastics injection-molding process, the tape-shaped heating conductor 11a being inserted into the corresponding injection-molding die during manufacturing of the joining portion 4b and being overmolded by the plastic material of the joining portion 4b. By applying an electric current to the two heating elements 11, the thermoplastic material of the half-shell 1 and the cover element 2 in the region of the joining portions 3a, 3b and 4a, 4b is heated beyond the melting temperature, and a welded connection of the half-shell 1 and the cover element 2 is implemented.

The metal conductors 11a which have been inserted as a heating element 11 may subsequently be utilized for conducting signals (e.g. controlling an energy store) or for conducting power to electrical consumers (e.g. to the lighting of a bicycle or to an electric motor of an electrically operable bicycle).

Figure 14:
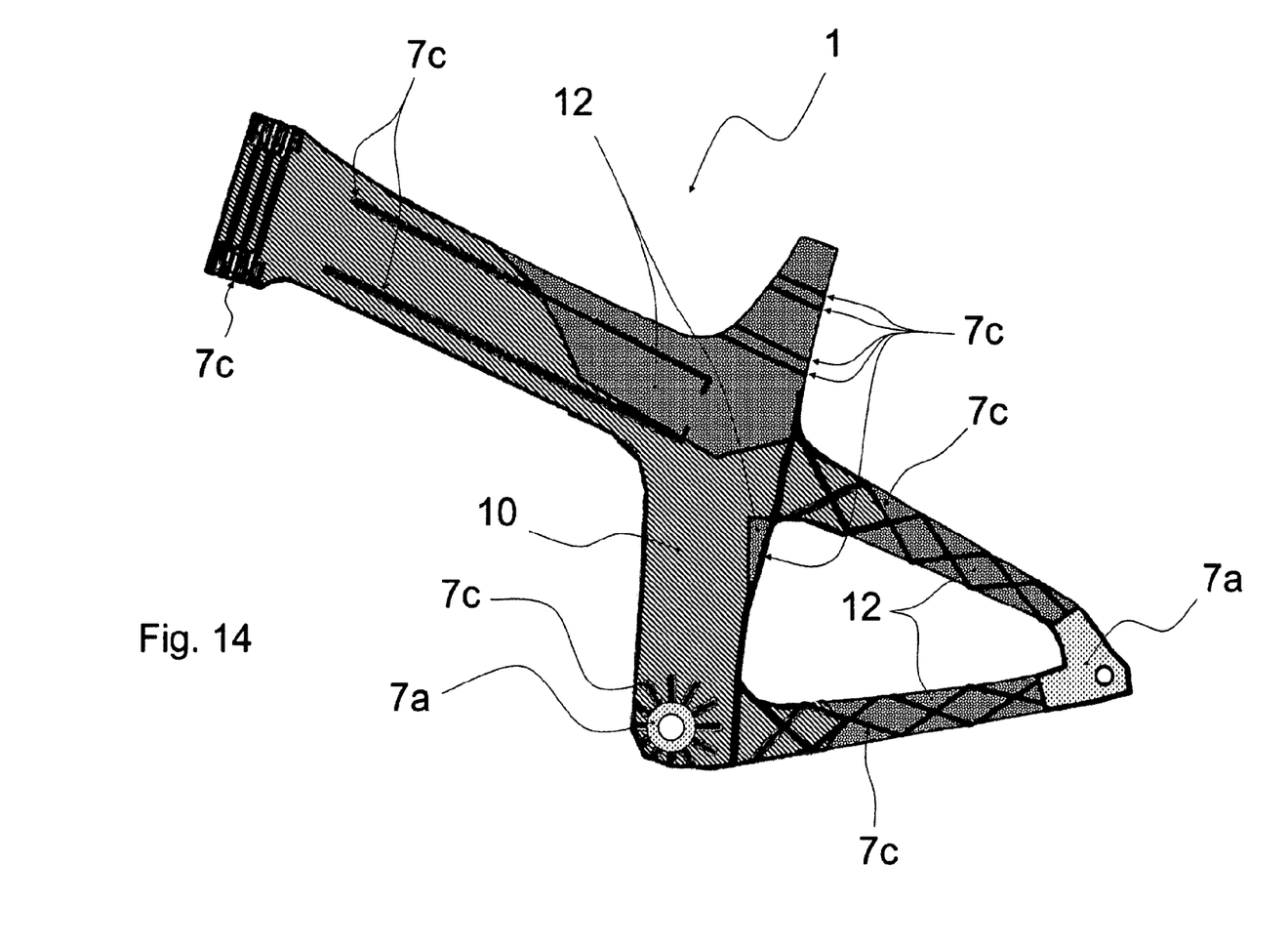
FIG. 14 shows a plan view of the inner region of a half-shell of a bicycle frame according to the invention, having a fiber-reinforced thermoplastic organometallic sheet molded, back-molded and/or overmolded thereon.

FIG. 14 shows an interior view of a half-shell 1 of a further bicycle frame according to the invention. The half-shell 1 has function-integrating elements which are formed thereon in a plastics injection-molding process in the form of metallic inserts 7a and of stiffening ribs 7c. The stiffening ribs 11c preferably have a height-to-width ratio of less than 10. The half-shell 1 has zones with a fiber reinforcement which is developed to a varying degree, such that the resilience of the zones is adapted to the stress which is to be expected there. The half-shell 1 is likewise manufactured in a plastics injection-molding process, merely a part-region of the half-shell 1 being formed by one or more fiber-reinforced thermoplastic organometallic sheets 10 which are molded, backmolded or overmolded thereon. The part-regions form the aforementioned zones with a fiber reinforcement which is developed to a varying degree in comparison with the injection-molded regions 12 (which preferably have a short-fiber or long-fiber reinforcement). In this context, one also refers to a hybrid construction of the half-shell 1 consisting of injection-molded regions 12 and regions which are formed by at least one fiber-reinforced thermoplastic organometallic sheet 10 manufactured by means of a forming process. The organometallic sheet or sheets 10 is/are arranged in regions suited to high mechanical loads, such as e.g. in the region of the bottom bracket, of the steering tube or of the top or bottom tube of a bicycle frame. The forming process of the organometallic sheet or sheets 10 here may take place prior to or during the plastics injection-molding process (i.e. within the injection-molding die required therefor). The connection of the injection-molded regions 12 with the organometallic sheet or sheets 10 takes place during the injection-molding process, preferably by way of partial initial melting and welding of the thermoplastic organometallic sheet to or through the injected plastic material forming the injection-molded regions 12. The organometallic sheet 10 may have a multilayered construction consisting of at least two layers. Preferably, here a layer having a glass-fiber reinforcement alternates with a layer having a carbon-fiber reinforcement. Furthermore preferably, the layer having a carbon-fiber reinforcement forms the outer surface (visible face) of the bicycle frame. A cover element 2 (not illustrated in more detail here) which, together with the half-shell 1, forms a bicycle frame according to the invention is configured at least substantially in a mirror-imaged manner to the half-shell 1.

Figure 15:
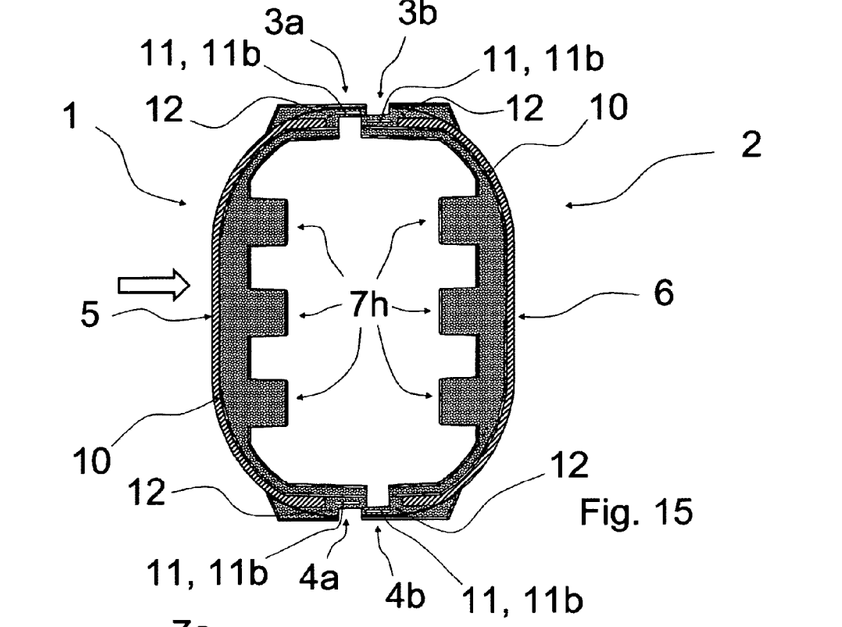
FIG. 15 shows a cross-sectional illustration of a further bicycle frame according to the invention, having heating elements which are arranged in the region of the joining portions.

FIG. 15 shows a cross-sectional illustration of a bicycle frame according to the invention. The bicycle frame is formed by a half-shell 1 consisting of a thermoplastic material, which is fiber-reinforced at least in regions, and by a cover element 2, which is, at least in regions, connected to the half-shell 1 and preferably closes said half-shell 1. The cover element 2 is configured at least substantially in a mirror-imaged manner to the half-shell 1. The half-shell 1 and the cover element 2 may be connected to one another by overlapping and/or mutually closely fitting joining portions 3a, 3b, 3a, 4b, the half-shell 1 and the cover element 2 not yet being fully pushed into one another (as indicated by the double arrow) in the cross section illustrated here. The half-shell 1 and the cover element 2 may be connected by means of an adhesive layer and/or a welded connection and/or a screw connection and/or a riveted connection and/or a clinch connection. The half-shell 1 and the cover element 2 have a U-shaped cross section 5, 6 having, adjacent thereto, the joining portions 3a, 3b, 4a, 4b. At least one heating element 11 which can be supplied with electrical power is in each case arranged in the region of the joining portions 3a, 3b, 4a, 4b, the heating element 11 being preferably formed by at least one carbon fiber 11b. Alternatively, the heating element 11 which can be supplied with electrical power may also be formed by at least one metal conductor 11a, or also by a combination of at least one metal conductor 11a and at least one carbon fiber 11b. The heating elements 11, 11a are accommodated within the joining portions 3a, 3b, 4a, 4b. The half-shell 1 and the cover element 2 have at least one function-integrating element 7 which is formed thereon, in particular formed thereon in a plastics injection-molding process. The half-shell 1 and the cover element 2 have function-integrating elements 7 which are formed thereon in a plastics injection-molding process in the form of metallic inserts 7a (in this case a bearing), of stiffening ribs 7c and of screw domes 7h for accommodating screw elements (not illustrated in more detail here). In a complementary manner, the function-integrating element may be configured as a storage-space element for accommodating e.g. an electrical energy store, as a retaining element, as a protection element, as a spray-guard element, as a lighting-accommodating element, as a connection element, as a media duct or as an impact-protection element. The half-shell 1 and the cover element 2, in the connected state, enclose a cavity, at least one electric conductor and/or at least one control line and/or at least one media line and/or at least one motion transmission organ and/or at least one energy store being able to be accommodated within the cavity. At least one joining portion 3a, 3b, 4a, 4b may be concealed, at least in regions, by a concealing element (not illustrated in more detail here) formed thereon, in particular formed thereon in a plastics injection-molding process. The half-shell 1 and the cover element 2 have in each case zones with a fiber reinforcement which is developed to a varying degree, such that the resilience of the zones is adapted to the stress which is to be expected there. The half-shell 1 and the cover element 2 are manufactured in a plastics injection-molding process, merely one or more part-region/s of the half-shell 1 and/or of the cover element 2 being formed by at least one fiber-reinforced thermoplastic organometallic sheet 10 which is molded, backmolded and/or overmolded thereon. In particular the joining portions 3a, 3b, 4a, 4b are manufactured in a plastics injection-molding process in order to ensure a high accuracy of mutual fit between the joining portions 3a, 3b, 4a, 4c. The part-regions form the aforementioned zones having a fiber reinforcement which is developed to a varying degree in comparison with the injection-molded regions 12 (which preferably have a short-fiber or long-fiber reinforcement). In this context, one also refers to a hybrid construction of the half-shell 1 and of the cover element 2 consisting of injection-molded regions 12 and regions which are formed by at least one fiber-reinforced thermoplastic organometallic sheet 10 which is manufactured by means of a forming process. The organometallic sheet or sheets 10 are arranged in regions suited to high mechanical loads, such as e.g. in the region of the bottom bracket, of the steering tube or of the upper or lower tube of a bicycle frame. The forming process of the organometallic sheet or sheets 10 here may take place prior to or during the plastics injection-molding process (i.e. within the injection-molding die required therefor). The connection of the injection-molded regions 12 with the organometallic sheet or sheets 10 takes place during the injection-molding process, preferably by way of partial initial melting and welding of the thermoplastic organometallic sheet to or through the injected plastic material forming the injection-molded regions 12. The fiber reinforcement of the thermoplastic material of the organometallic sheet or sheets 10 comprises, in regions or entirely, continuous fibers. The fiber reinforcement of the thermoplastic material of the organometallic sheet 10, of the injection-molded regions 12 and/or of the function-integrating elements 7 may be formed by glass fibers, carbon fibers, aramid fibers, basalt fibers, mineral fibers, fibers from renewable raw materials, metal fibers and/or by polymer fibers. The thermoplastic material of the organometallic sheet 10, of the injection-molded regions 12 and/or of the function-integrating elements 7 may comprise polyamide (PA), in particular polyamide 6 or polyamide 6.6, polypropylene (PP), polyethylene (PE), POM (polyoxymethylene), polyphenylene sulphide (PPS), polyether ether ketone (PEEK), polyetherimide (PEI), polyethylene terephthalate (PET), polyphthalamide (PPA), or combinations of the aforementioned plastics. The organometallic sheet 10 may have a multilayered construction consisting of at least two layers. Preferably, here a layer having a glass-fiber reinforcement alternates with a layer having a carbon-fiber reinforcement. Furthermore preferably, the layer having a carbon-fiber reinforcement forms the outer surface (visible face) of the bicycle frame.

Figure 16:
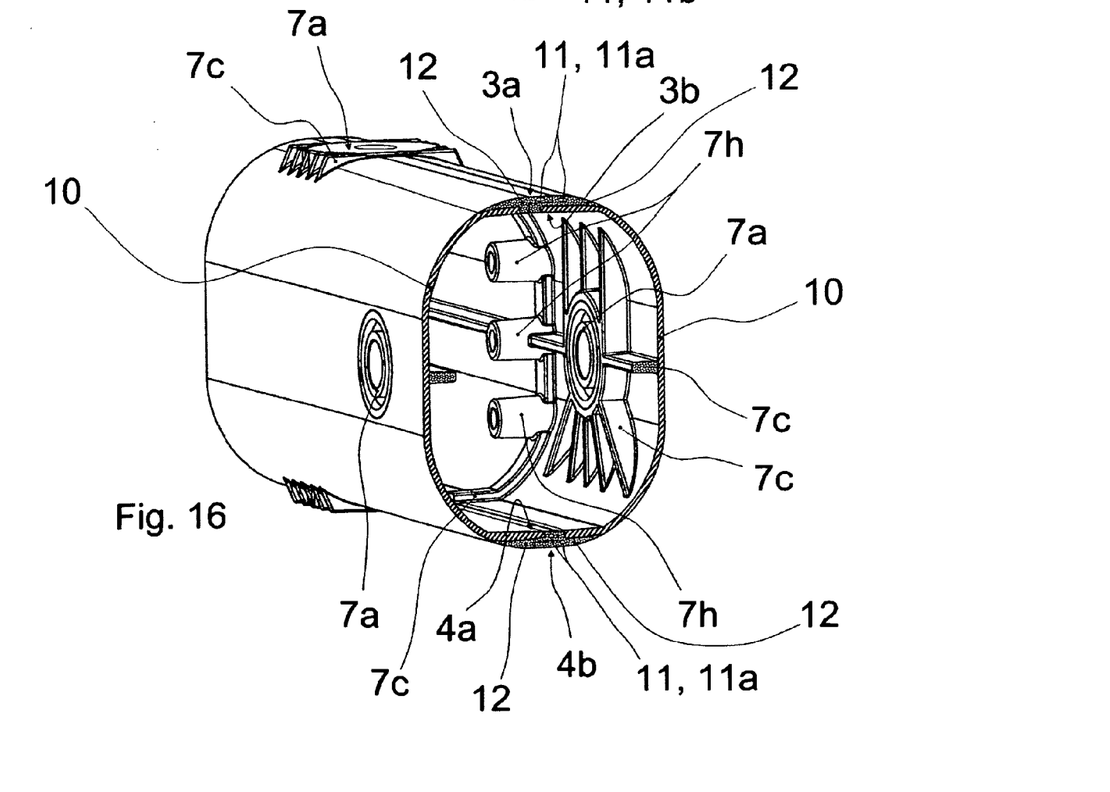
FIG. 16 shows a three-dimensional partial view of a further bicycle frame according to the invention, having heating elements which are arranged in the region of the joining portions.

FIG. 16 shows a three-dimensional partial illustration of the bicycle frame according to the invention of FIG. 14, the heating elements 11 which are accommodated within the joining portions 3a, 3b, 4a, 4b here being formed by metal conductors 11a. By applying an electric current to the two heating elements 11, the thermoplastic material of the half-shell 1 and the cover element 2 in the region of the joining portions 3a, 3b and 4a, 4b is heated beyond the melting temperature, and a welded connection of the half-shell 1 and the cover element 2 is implemented. The metal conductors 11a which have been inserted as a heating element 11 may subsequently be utilized for conducting signals (e.g. controlling an energy store) or for conducting power to electrical consumers (e.g. to the lighting of a bicycle or to an electric motor of an electrically operable bicycle).

A method for manufacturing a bicycle frame according to FIGS. 15 and 16 comprises the following steps: providing at least one half-shell 1 according to the invention, consisting of a thermoplastic material which is fiber-reinforced at least in regions; providing a cover element 2; connecting, in regions, the half-shell 1 and the cover element 2 to form a closed hollow body. The provision of the half-shell 1 and of the cover element 2 takes place by way of at least one forming step of a fiber-reinforced thermoplastic organometallic sheet 10, wherein the half-shell 1 and the cover element 2 are in each case manufactured in a plastics injection-molding process and wherein merely one or more part-region/s of the half-shell 1 and of the cover element 2 is/are formed by the at least one fiber-reinforced thermoplastic organometallic sheet 10 molded, backmolded and/or overmolded thereon. The forming step may take place in a separate forming tool or directly within the injection-molding die required for the plastics injection-molding process.

The invention claimed is:

1. Bicycle frame formed by at least one half-shell bicycle frame element comprising a thermoplastic material, which is fibre-reinforced at least in regions, and by a covering bicycle frame element, which is, at least in regions, connected to the half-shell bicycle frame element, and closes said half-shell bicycle frame element, wherein
   a. either frame element comprises specific bicycle frame structural components comprising a bottom bracket and steering tube and is manufactured in a plastics injection-moulding process,
   b. at least one selected region of at least one of the frame elements is formed by at least one fibre-reinforced thermoplastic organic sheet which is backmoulded thereon, and
   c. the at least one fibre-reinforced thermoplastic organic sheet is arranged in a region of the said at least one specific structural component of the bicycle frame, wherein the half-shell frame element and the covering frame element are connected to one another by overlapping and/or mutually closely fitting joining portions, and wherein at least one heating element, which can be supplied with electrical power, is arranged in the region of the joining portions, the heating element being formed by at least one carbon fibre.

2. Bicycle frame according to claim 1, wherein the covering frame element is configured at least substantially in a mirror-imaged manner to the half-shell frame element.

3. Bicycle frame according to claim 1 wherein the half-shell frame element and the covering frame element are connected by a connection selected from one of the group of connections consisting of an adhesive layer connection, a welded connection, a screw connection, a riveted connection and a clinch connection.

4. Bicycle frame according to claim 1 wherein at least one frame element has at least one U-shaped cross section having, adjacent thereto, the joining portions.

5. Bicycle frame according to claim 4, wherein at least one frame element has at least two U-shaped cross sections which are coupled to one another via at least one joining portion.

6. Bicycle frame according to claim 1, wherein the at least one heating element being formed by at least one conductor.

7. Bicycle frame according to claim 6, wherein the heating element is accommodated within at least one of the joining portions.

8. Bicycle frame according to claim 1, wherein at least one frame element has at least one function-integrating element which is formed thereon, in a plastics injection-moulding process.

9. Bicycle frame according to claim 8, wherein the function-integrating element is selected from one of the group of function-integrating elements consisting of a stiffening rib, insert, retaining element, protection element, current-conducting element, spray-guard element, storage-space element, illumination-accommodating element, connection element, media duct, and an impact-protection element.

10. Bicycle frame according to claim 1, wherein at least one frame element encloses a cavity, in which one of an element selected from one of the group of elements consisting of one electric conductor, at least one control line, at least one media line, at least one motion transmission organ, and one energy store is arranged Within the cavity.

11. Bicycle frame according to claim 1 wherein at least one joining portion is, at least in regions, covered by a concealing element which is formed thereon in a plastics injection-moulding process.

12. Bicycle frame according to claim 1 wherein at least one frame element has in each case zones with a fibre reinforcement which is developed to a varying degree, such that the resilience of the zones is adapted to the stress which is to be expected there.

13. Bicycle frame according to claim 1 wherein at least one frame element is formed from the at least one fibre-reinforced thermoplastic organic sheet by a forming process.

14. Bicycle frame according to claim 1 wherein at least one frame element is manufactured in a plastics injection-moulding process, merely one or more part-regions of the at least one frame element being formed by the at least one fibre-reinforced thermoplastic organic sheet which is backmoulded thereon.

15. Bicycle frame according to claim 1 wherein the fibre-reinforced thermoplastic organic sheet comprises continuous fibres.

16. Bicycle frame according to claim 1 wherein the at least one fibre-reinforced thermoplastic organic sheet is fibre-reinforced of elements selected from one of the group of elements consisting of glass fibres, carbon fibres, ararnid fibres, basalt fibres, mineral fibres, fibres from renewable raw materials, metal fibres and polymer fibres.

17. Bicycle frame according to claim 1 wherein the thermoplastic material is made of a thermoplastic material and/or thermoplastic matrix of organic sheets comprising a plastic composition selected from one of the group of plastic compositions consisting of polyimide (PA), polypropylene (PP), polyethylene (PE), POM (polyoxymethylene), polyphenylene sulphide (PPS), polyether ether ketone (PEEK), polyetherimide (PEI), polyethylene terephthalate (PET), polyphthalamide (PPA), and combinations of the aforementioned plastics.

18. Bicycle having a bicycle frame according to claim 1.

19. Bicycle frame according to claim 1 wherein at least one frame element is manufactured in a plastics injection-moulding process, merely one or more part-region/s of the at least one frame element being formed by at least one fibre-reinforced thermoplastic organic sheet.

20. Bicycle frame formed by at least one half-shell bicycle frame element comprising a thermoplastic material, which is fibre-reinforced at least in regions, and by a covering bicycle frame element, which is, at least in regions, connected to the at least one half-shell bicycle frame element and closing said half-shell bicycle frame element by overlapping and/or mutually closely fitting joining portions and supplying at least one heating element formed by at least one carbon fibre arranged in the region of the joining portions with electrical power, wherein
  a. either frame element comprises specific bicycle frame structural components comprising a bottom bracket and steering tube and is manufactured in a plastics injection-moulding process,
  b. at least one selected region of at least one of the frame elements is formed by at least one fibre-reinforced thermoplastic organic sheet which is overmoulded thereon, and
  c. the at least one fibre-reinforced thermoplastic organic sheet is arranged in a region of the said at least one specific structural component of the bicycle frame.

21. Method for manufacturing a bicycle frame, comprising the following steps:
  providing at least one half-shell bicycle frame element consisting of a thermoplastic material, which is fibre-reinforced at least in regions,
  providing a covering bicycle frame element, and
  connecting, in regions, the half-shell bicycle frame element and the covering bicycle frame element by overlapping and/or mutually closely fitting joining portions and supplying at least one heating element formed by at least one carbon fibre arranged in the region of the joining portions with electrical power, to form a closed hollow body,
  wherein,
  the frame elements are manufactured in a plastics injection-moulding process, at least one selected region of at least one of the frame elements comprises specific bicycle frame structural components comprising a bottom bracket and steering tube and
  is formed by at least one fibre-reinforced thermoplastic organic sheet which is overmoulded thereon;
  the at least one fibre-reinforced thermoplastic organic sheet is manufactured. by means of a forming process; and
  the forming process of the at least one fibre-reinforced thermoplastic organic sheet takes place during the plastics injection-moulding process.

22. Bicycle frame formed by at least one half-shell bicycle frame element comprising a thermoplastic material, which is fibre-reinforced at least in regions, and by a covering bicycle frame element, which is, at least in regions, connected to the at least one half-shell bicycle frame element and closes said half-shell bicycle frame element by overlapping and/or mutually closely fitting joining portions and supplying at least one heating element formed by at least one carbon fibre arranged in the region of the joining portions with electrical power, wherein
  a. either frame element comprises specific bicycle frame structural components comprising a bottom bracket and steering tube and is manufactured in a plastics injection-moulding process,
  b. at least one selected region of at least one of the frame elements is formed by at least one fibre-reinforced thermoplastic organic sheet which is moulded thereon, and
  c. the at least one fibre-reinforced thermoplastic organic sheet is arranged in a region of the said at least one specific structural component of the bicycle frame.

23. Bicycle frame of claim 22, wherein the at least one fibre-reinforced thermoplastic organic sheet comprises unidirectionally oriented continuous fibres.

* * * * *